Jan. 2, 1940.   P. A. HERMAN   2,185,438
AUTOMOBILE HEADLIGHT
Filed April 26, 1938
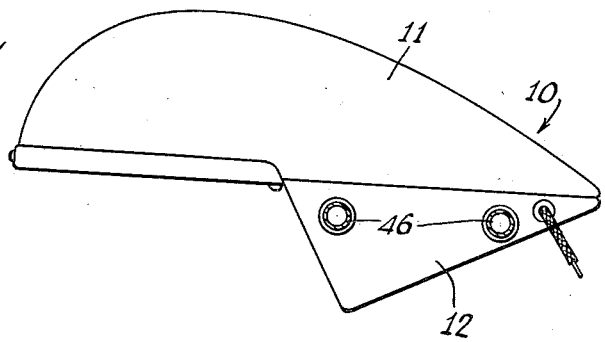
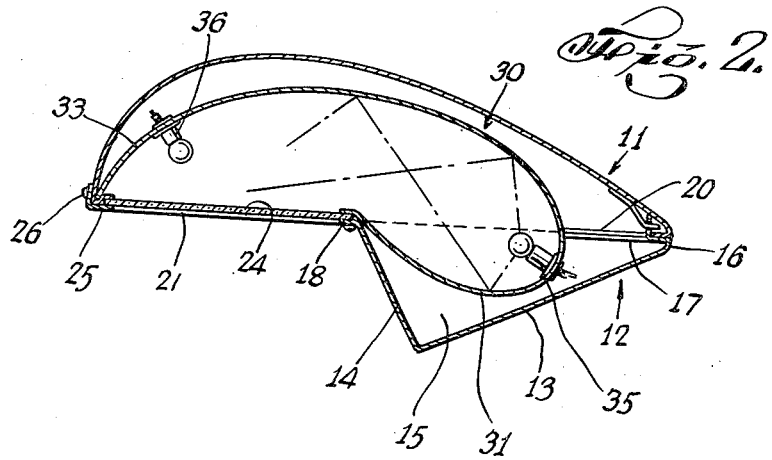
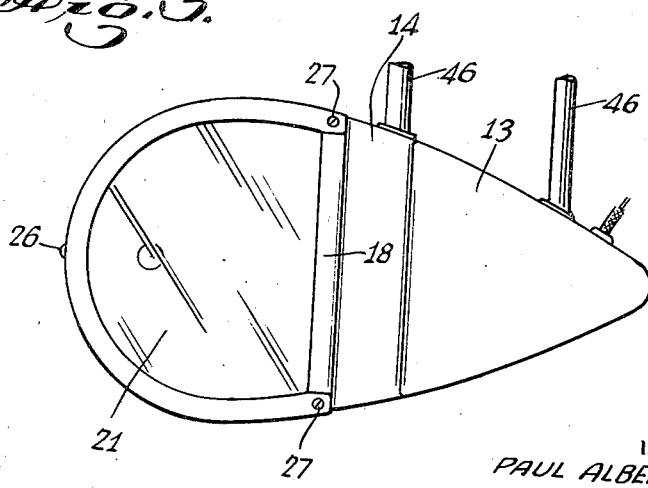
INVENTOR
PAUL ALBERT HERMAN
BY
Carl Miller
ATTORNEY Patented Jan. 2, 1940

2,185,438

UNITED STATES PATENT OFFICE 2,185,438

AUTOMOBILE HEADLIGHT

Paul Albert Herman, New York, N. Y.

Application April 26, 1938, Serial No. 204,299

1 Claim. (Cl. 240—41.1)

This invention relates to automobile headlights.

An object of this invention is to provide a headlight of the character described, wherein the lamps cannot be seen by the operators of oncoming cars.

A further object of this invention is to provide a headlight which will amply illuminate the road without causing glare or blinding operators of cars coming in the opposite direction.

A still further object of this invention is to provide a strong, rugged and durable automobile headlight of the character described, which shall be inexpensive to manufacture, easy to assemble, attractive in appearance, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawing, in which is shown one of the various possible illustrative embodiments of this invention, Fig. 1 is a side, elevational view of an automobile headlight embodying the invention;

Fig. 2 is an elevational, cross-sectional view of the headlight shown in Fig. 1; and Fig. 3 is a bottom plan view of the headlight embodying the invention.

Referring now in detail to the drawing, 10 designates an automobile headlight embodying the invention. The same comprises a casing made of a shell 11 and a lower shell 12, attached together in the manner hereinafter described.

The bottom shell 12 comprises a flat, upwardly and rearwardly inclined wall 13, of substantially triangular shape, and an upwardly and forwardly inclined wall 14 extending from the lower end of wall 13. Extending from the walls 13 and 14, are side walls 15, substantially of triangular shape and diverging toward the rear. The rear end of the wall 13 may be rounded, as at 16, where the rear ends of side walls 15 meet. Said side walls 15 have inwardly extending horizontal rim flanges 17 at the upper ends thereof. Wall 14 has a forwardly extending horizontal lip 18 at the upper end thereof, at the level of flanges 17.

The upper casing shell 11 has substantially the shape of half an egg shell, cut through the longitudinal axis, being wide at the front and tapering rearwardly. The bottom shell covers substantially the rear half of the shell 11. Said shell 11 is open at the bottom and formed with a horizontal, inwardly extending flange 20, contacting the flange 17, said flanges being fixed together by rivets, bolts, welding or in any suitable manner.

The opening 21 between the upper end of the wall 14 and the forward half of the shell 11, may be closed by a transparent or translucent plate 24, of glass or the like light transmitting material. Said plate 24 may be held against movement by a horeshoe shaped clamping member 25 of angular, transverse cross-section, riveted or otherwise attached to the shell 11 and lip 18, as at 26 and 27.

Within the shells 11 and 12, is a reflector 30 having a portion 31 of U-shape longitudinal cross-section, disposed within the shell 12 and the rear portion of the shell, and a forwardly and downwardly curved portion 33 extending from portion 31 and disposed within the forward part of the shell 11 and above the plate 24.

The portion 31 of the reflector supports a lamp 35, preferably disposed below the level of plate 24, whereas, the portion 33 of the reflector supports a lamp 36 disposed above plate 24. The rear portion 31 of the reflector serves to reflect light from the lamp 35 forwardly onto the portion 33, such rays being reflected downwardly through the plate 24 onto the road. Some rays may be reflected from the upper part of portion 31 at an angle forwardly through the plate 24 to illuminate the road in advance of the automobile. Rays from the lamp 36 pass directly through the plate 24 and are also reflected by the reflector through said plate. Since the plate 24 is in horizontal position, there can be no glare to disturb operators of oncoming cars.

Some rays passing through the plate 24 may impinge on the front surface of the wall 14 of the lower shell 12, to be reflected forwardly to aid in illuminating the road.

The headlight may be supported on the automobile by rods 46 fixed to the shell portion 12 of the casing.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

An automobile headlight comprising a casing made of an upper and a lower shell, the lower shell comprising an upwardly and rearwardly inclined triangular wall, and an upwardly and forwardly inclined wall extending from the lower end of said first wall, and substantially triangular side walls connecting said first mentioned walls of said shell and diverging inwardly toward the rear, said shell being open at the top, the upper shell being open at the bottom, and being substantially of the shape of half an egg cut through the longitudinal axis, the upper rim edge of the lower shell being attached to the rear half of the lower rim edge of the upper shell, the opening between the lower shell and the forward half of the upper shell being closed by a light transmitting plate, a reflector within said casing having a curved portion of U-shape longitudinal cross-section, disposed within the lower shell and the rear portion of the upper shell, said reflector having a forwardly and downwardly curved portion disposed above said plate, a lamp within said reflector mounted on said portion above said plate whereby light from said lamp is transmitted through said plate and some of the rays therefrom strike said upwardly and forwardly inclined wall and are reflected by the latter.

PAUL ALBERT HERMAN.